Oct. 27, 1942.         D. W. JUSTIS         2,300,121
DEEP WELL PUMP
Filed Nov. 30, 1940
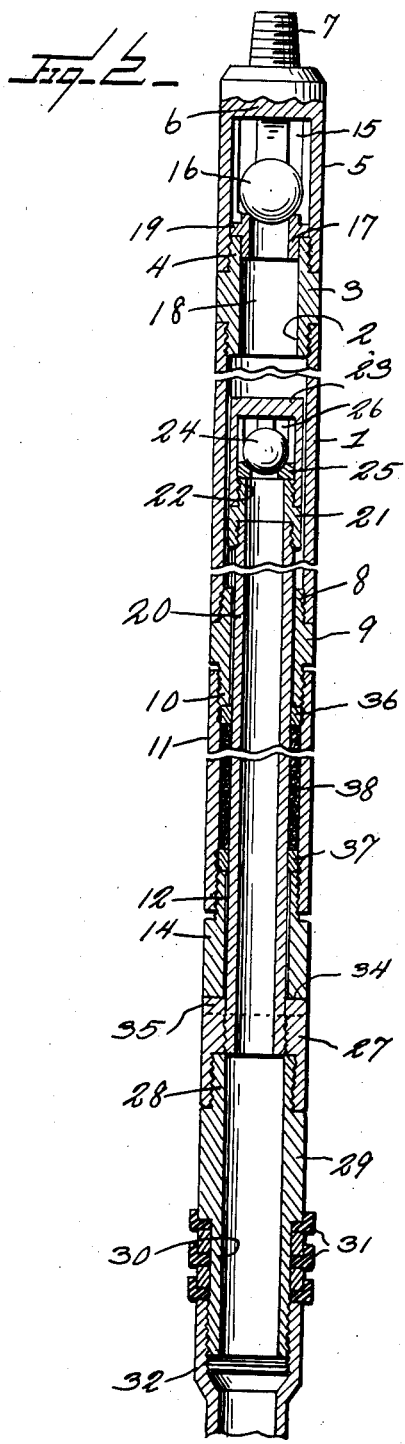
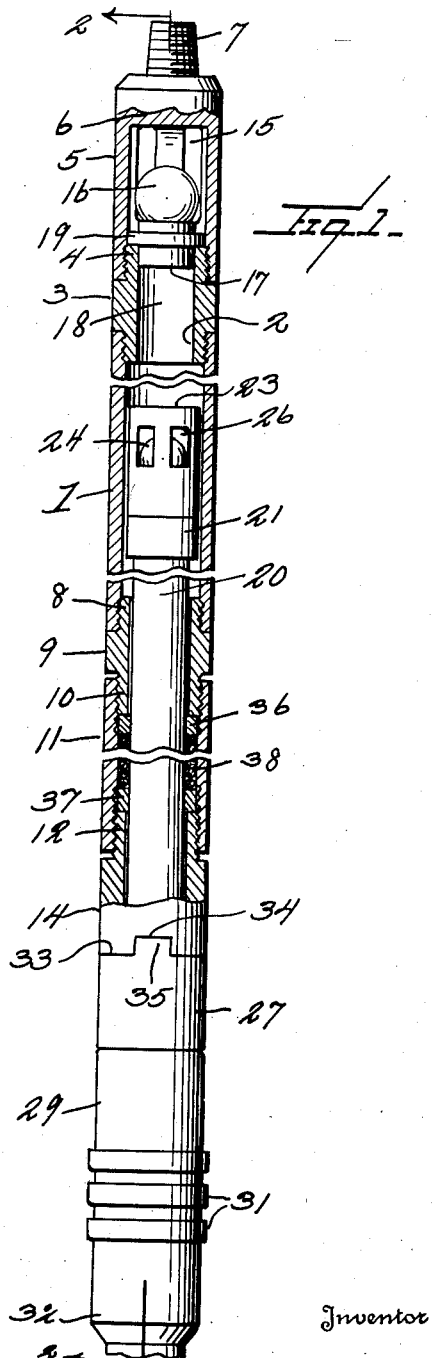
Inventor
Daniel W. Justis
By Watson E. Coleman
Attorney Patented Oct. 27, 1942

2,300,121

UNITED STATES PATENT OFFICE 2,300,121

DEEP WELL PUMP

Daniel W. Justis, Jal, N. Mex.

Application November 30, 1940, Serial No. 368,055

1 Claim. (Cl. 103—158)

This invention relates to a deep well pump, and it is an object of the invention to provide a device of this kind of a type known as an "insert pump."

It is also an object of the invention to provide a pump especially designed for lifting oil from marginal wells and wherein the pump is of a type to permit repair without requiring the services of an expert mechanic and also of an assembly whereby is eliminated frequent replacements.

The invention consists in the details of construction and in the combination and arrangement of the several parts of my improved deep well pump whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Fig. 1 is a view partly in elevation and partly in section illustrating a pump constructed in accordance with an embodiment of my invention;

Fig. 2 is a sectional view taken substantially on the line 2—2 of Fig. 1 with parts in elevation.

As disclosed in the accompanying drawing, 1 denotes a cylindrical tube of predetermined length. This tube 1 is open at its opposite ends and threading into its upper extremity is a depending nipple 2 of a bushing 3. The periphery of this bushing 3 is flush with the periphery of the tube 1 and this bushing 3 is provided with an upwardly disposed nipple 4 which threads within the lower open end of a top cage 5. The top or closed end 6 of the cage 5 has extending therefrom a conventional threaded extension 7 for connection with the usual valve rod.

Threading within the lower end portion of the tube 1 is an upstanding nipple 8 carried by the coupling or bushing 9. This coupling or bushing 9 also has its periphery flush with the periphery of the tube 1. At this time it is also to be noted that the periphery of the cage 5 is flush with the periphery of the bushing 3.

The coupling or bushing 9 is also provided with a depending nipple 10 which threads within the upper end portion of a cylindrical jacket 11 of desired length. The lower end portion of the jacket 11 has threading therein an upstanding nipple 12 carried by a bushing 14. The periphery of the coupling 9 is substantially flush with the periphery of the tube 1 and the jacket 11 while the periphery of the bushing 14 is substantially flush with the periphery of the jacket 11.

The cage 5 in its side wall is provided therearound with the elongated ports 15 and freely working within the cage 5 is a ball valve 16. This valve 16 coacts from above with a valve seat 17. This seat 17 is of desired length and has its lower portion snugly engaging from above within the bore 18 of the bushing 3.

Intermediate its ends the valve seat 17 is provided with an outstanding surrounding flange 19 resting from above upon the inserted end of the nipple 4 whereby the valve seat 17 is effectively maintained in desired position.

The parts hereinbefore referred to are comprised in the construction of the travelling valve of my improved pump and which travelling valve coacts with a stationary valve as will be hereinafter explained.

The stationary valve, as herein disclosed, comprises an elongated tubular plunger 20 open at both ends and which is telescopically disposed within the travelling valve with said travelling valve reciprocating lengthwise of the plunger.

The plunger 20 is open at both ends and threaded upon the upper end of the plunger 20 is a coupler 21 provided with an upstanding nipple 22. Threading upon the nipple 22 from above is the lower or open end portion of a cage 23 in which is positioned a ball valve 24 for coaction with a valve seat 25. The valve seat 25 is snugly engaged within the cage 23 and rests upon the upper or inserted end of the nipple 22. The peripheral wall of this cage 23 is provided therearound with the usual slotted openings 26.

Threading upon the lower end portion of the plunger 20 is an adapter 27 and threading from below, as at 28, within this adapter 27 is the upper end portion of an elongated hold-down 29. The lower portion 30 of this hold-down 29 is reduced and arranged upon said reduced portion 30 are the conventional cup packings 31 effectively maintained upon the hold-down by the hold-down nut 32. This hold-down nut 32 is adapted to coact in a well known manner with the conventional tubing seat for the pump (not shown).

The upper end of the adapter 27 provides an annular shoulder 33 surrounding the plunger 20 and with which is adapted to contact the lower end of the bushing 14 comprised in the construction of the travelling valve.

In the present embodiment of the invention the lower end of the bushing 14 at diametrically opposed points is provided with recesses 34 in which engage the upstanding lugs 35 carried by the upper end of the adapter 27 whereby the travelling valve and the stationary valve will be locked against rotation one with respect to the other.

Surrounding the plunger 20 are the bronze washers 36 and 37, each of said washers snugly fitting within the space between the plunger 20 and the jacket 11. Between these washers 36 and 37 is a packing 38. This packing 38 is preferably of a high pressure graphite asbestos type surrounding the plunger 20. This packing is of a spiral or ring type as may be preferred. The upper ring or washer 36 is contacted by the nipple 10 of the coupling 9 while the ring or washer 37 is contacted by the nipple 12 of the bushing 14. Upon threading these nipples 10 and 12 inwardly of the jacket 11 the packing 38 may be readily compressed to desired thickness.

It is to be noted that the valve seat 17 is oversize to assure free passage for the fluid during a pumping operation, and it is to be particularly pointed out that the assembly of the pump is such as to assure effective lifting of the oil or the like but which assembly also allows for ready pulling of the pump from the well.

It is believed to be obvious from the foregoing description how the pump operates upon reciprocation of the travelling valve, and it is also to be noted that upon abnormal upward movement of the travelling valve the nipple 8 will contact with the coupler 21 so that upon continued pull the pump as a unit may be withdrawn from the well. It is also believed to be obvious that by the use of the packing 38 the pump is self-lubricating in a manner to eliminate the use of any lubricating mechanism. It is to be pointed out that on the down stroke of the travelling valve the pressure of the column of fluid above the packing 38 is offset by the friction of the plunger 20 against the packing 38 thereby preventing distortion of the packing. It is to be particularly pointed out that the packing 38 is fully floating and tightens itself automatically when needed.

From the foregoing description it is thought to be obvious that a deep well pump constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

In an oil well pump, the combination of a stationary valve and a travelling valve, said travelling valve comprising an elongated sectional tubular member, one of the sections constituting an elongated jacket, a non-return valve structure carried by said sectional tubular member at a location above the jacket, said sectional member including sections threading into the opposite end portions of the jacket, the stationary valve including an elongated tubular plunger extending from below within the sectional member of the travelling valve, a non-return valve carried by said plunger above the jacket of the travelling valve, fully floating and compressible packing encircling the plunger and disposed a material distance along the jacket, washers freely surrounding the plunger of the stationary valve and having direct contact with the opposite ends of the packing, the sections threading within the opposite end portions of the jacket having nonyielding contact with the washers to provide means for tightening the packing.

DANIEL W. JUSTIS.